May 29, 1956 E. E. VAN HAM 2,747,404
LIQUID LEVEL INDICATOR
Filed July 26, 1954 2 Sheets-Sheet 1

Inventor:
Ernest E. van Ham
by Emery, Booth, Townsend
Miller & Weidner Attys

May 29, 1956  E. E. VAN HAM  2,747,404
LIQUID LEVEL INDICATOR
Filed July 26, 1954  2 Sheets-Sheet 2

Inventor:
Ernest E. van Ham,
By Emery, Booth, Townsend
Miller & Weidner Attys

## 2,747,404
Patented May 29, 1956

2,747,404

LIQUID LEVEL INDICATOR

Ernest E. Van Ham, Somerville, Mass., assignor to Jerguson Gage & Valve Company, Somerville, Mass., a corporation of Massachusetts Application July 26, 1954, Serial No. 445,813

6 Claims. (Cl. 73—302)

This invention relates to apparatus for indicating the level of liquid in a container such, for example, as a boiler, and in particular to an apparatus of the general type disclosed in the patent to Tripp, 722,645, wherein a constant head of liquid and a variable head proportionate to the height of liquid in the container are applied to opposite sides of a differential manometer, which may be located at a conveniently remote point as distinguished from the ordinary gage glass which is mounted directly on the exterior wall of the boiler adjacent to the normal levels therein.

The purpose of the invention is to provide a combination of parts whereby the indication of the manometer, when the water in the boiler is at its normal or operating level, that is, neither too high nor too low, will always be at the same point whatever the temperature or pressure conditions in the boiler.

The invention finds a particular application to steam boilers and, to make the description and claims more readily comprehensible by the use of concrete rather than abstract words I shall refer to the liquid container as a boiler, to the liquid the height of which is to be measured as water, or boiler water, and to the fluid which exerts pressure on the liquid independently of the weight of the latter as steam and the pressure as steam pressure. As a matter of scope however the words are to be taken in a generalized sense.

My invention will be understood by reference to the following description taken in connection with the accompanying drawings wherein.

Figure 4:
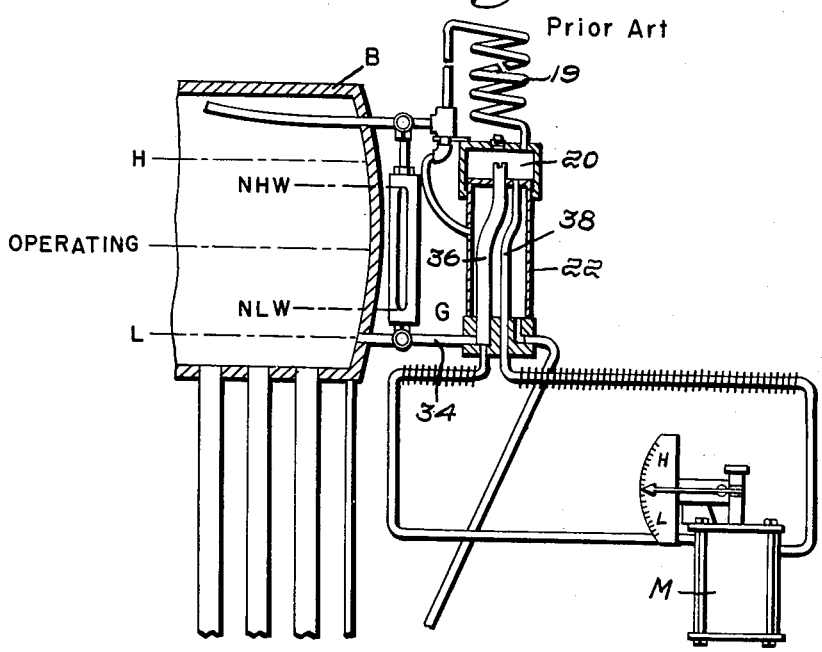
Fig. 4 is a similar view of a construction disclosed in the patent to Winton 2,337,171 here shown to facilitate the explanation of the invention.

The ordinary layman in considering the conventional gage glass on a boiler such as that shown at G in Fig. 4, secure in the adage that water seeks its own level, will probably assume that the height of the column in the gage glass is the same as the height of the liquid in the boiler. This however is not the case, because the specific gravity of water diminishes as its temperature is raised and to a marked degree when we are concerned with the temperatures and pressures encountered in boiler practice. The gage glass is exposed to the ambient temperature exterior to the boiler and the column of water therein is of small volume and radiates heat quickly. There is thus a column of relatively cold and heavy water in the gage glass balancing a column of relatively hot and light water inside the boiler, and the level in the gage is too low. Furthermore, in practice the level in the boiler fluctuates. If the level in the boiler goes down cold water in the gage glass is returned to the interior of the boiler and mixed with the mass of hot water therein and, as the level goes up, hot water, not as yet cooled, is returned to the gage glass. It may be asserted that in practice it is highly unlikely that the level in the gage glass is at any given instant the same as the level in the boiler.

In the arrangement of parts shown in the Tripp patent above referred to and many later constructions embodying the same fundamental principles, in general the builders provided only a means whereby the manometer gave a reading corresponding to that of a conventional gage glass mounted on the boiler drum, notwithstanding the thermal errors above referred to. However, in the patents to Winton 2,347,860 and 2,337,171, provision is made for varying the reference head directly with changes in the specific gravity of the boiler water and with the specific objective of indicating at the manometer the actual level as opposed to the gage glass level. Thus, referring to Fig. 4 which is a somewhat simplified version of Fig. 1 in the patent to Winton 2,337,171, there was provided a constant pressure chamber comprising a relatively large cup 20 and a depending leg 38 therefrom, fed with condensate from the boiler B and in which a fixed level of water, conveniently somewhat higher than the operating "high water" level of water in the boiler, was maintained by means of an overflow 36, while the variable pressure varying with the actual height of water in the boiler was taken from a pipe 34 leading from the water-containing spaces of the boiler. A steam jacket 22, fed from the boiler, maintained these columns at the temperature of the interior of the boiler. It is clear that if the differential of the heads of these heated columns could be accurately measured by the manometer M the indication of the manometer would give the actual level. To transmit these heads to the manometer M, which was in a relatively cool environment, and to avoid errors due to transfer of heated water from place to place within the system, Winton provided substantially horizontal offtakes from the lower ends of these columns of such length, and otherwise so arranged, that water passing therethrough was cooled to the ambient temperature exterior of the boiler without change of head. This is indicated diagrammatically in the drawings by the diagonal lines suggestive of cooling fins, although in practice they would not ordinarily be used. The length of these horizontal offtakes should be such that their volumetric capacity is greater than the displacement created by fluctuations of the manometer. In practice a length of about two feet has been found sufficient under normal cooling conditions. In the other ends of these horizontal ranges connections were made to the manometer M at a remote location. The manometer illustrated in the diagram is that described in the Winton Patent 2,347,861. The differential impressed on the manometer thus corresponded to the actual level in the boiler under the temperature and pressure conditions obtaining therein. We might fill such a system with cold water and by applying a suitable correction provide for the manometer a correct reading scale throughout its range for any given temperature, and we might indeed provide separate scales, all cooperating with the same pointer for different pressures.

If the water in the boiler reached the level H equal to the constant level maintained in the datum cup 20, the pressures would be balanced and the indication at the manometer would be the same whatever the specific gravity of the water. Everywhere else the indications would be too high on a given scale if the temperature increased, and too low if the temperature decreased.

There is a normal operating level in a boiler intermediate between the nominal high water level and the nominal low water level which it is desired to maintain in practice. The scale of the manometer indicates the fluctuations therefrom. In accordance with my invention, when the water is in fact at this level it is always so indicated by the manometer at the same intermediate point of the scale whatever the temperature may be. The scale may be calibrated for any desired specific gravity of water. When the scale is calibrated for a low specific gravity corresponding to a normal desired high steam pressure and the boiler is in fact operating at a lower pressure and the specific gravity of the water is therefore greater than that for which the scale is calibrated, then if the level rises above normal the manometer will read too high. If it falls it will read too low. These are relatively harmless errors. If the water in a gage goes out at the bottom of the glass it does not mean that the crown sheet of the boiler is bare to the fire, but it means we had better do something about it. If it goes out of the top of the gage it does not mean that water is going into the steam lines, but it again means that we should do something.

Figure 1:
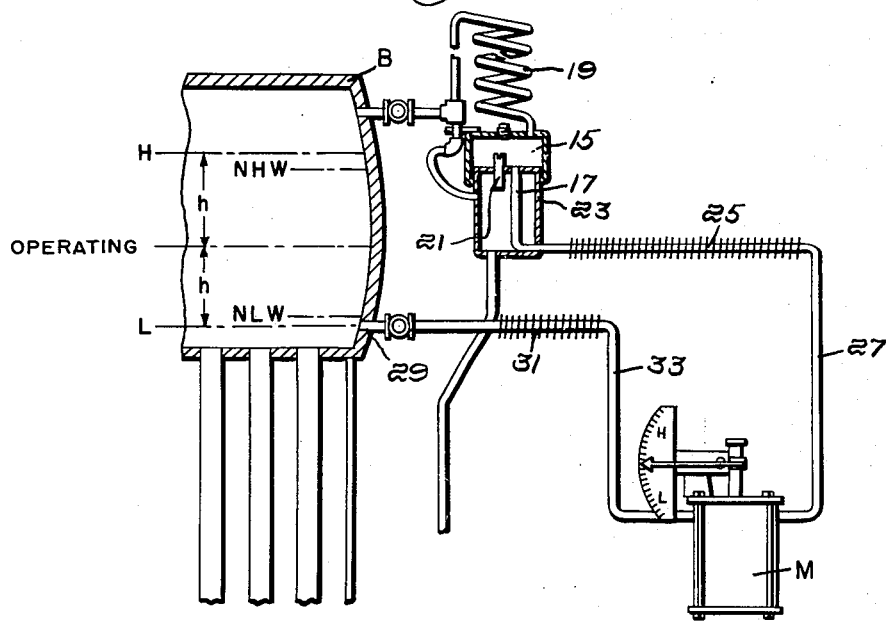
Fig. 1 is a schematic diagrammatic view of a portion of a boiler with measuring facilities associated therewith exemplary of my invention. The parts are not to scale and in general one might refer to the view as a development in a plane as an attempt is made to illustrate all the parts in the plane of the paper to permit them to be viewed as a whole.

Referring now to Fig. 1 of the drawings, B indicates the upper drum of a boiler. The normal operating level is so indicated. N. H. W. and N. L. W. indicate the nominal high and low operating levels and usually, but not necessarily, will be equally spaced from the operating level. H is a level corresponding to the top of the constant pressure column and L is a level in the water-containing space of the boiler, conveniently somewhat below N. L. W. In certain of the constructions to be described H and L are equally spaced from the operating level by the distance $h$.

Referring now to Fig. 1, I there show, exterior to the boiler, a chamber the contents of which forms the upper portion of the constant pressure column operating on one side of the manometer M. It may comprise an enlarged cup-like portion 15, and a reduced downward extension 17 which reaches to the normal operating level. The condenser 19, fed with steam from the boiler, supplies condensate to the cup 15 and keeps it filled to the top of an overflow pipe 21 and thus maintains a fixed level at the point H. The container described, extending vertically from H to the operating level, is heated to the internal temperature of the boiler. Most conveniently this is effected from heat supplied from the boiler itself, and I have herein shown a steam jacket 23. At the lower end of the container and at the operating level an offtake 25 extends from the steam jacket substantially horizontally for a suitable distance to effect cooling to the ambient temperature exterior of the boiler of the water passing therethrough, as indicated by the diagrammatic showing of cooling fins. From the outer end of this offtake a connection 27 leads downwardly to a point at least as low as the low level L and to one side of the manometer. The water in this downcomer 27 forms a part of the constant pressure column the head of which is exerted on one side of the manometer. It is convenient to view the portion of this between the operating level and level L as a second container joined to the first by connection 25, while the portion below L is merely a connection to the remote manometer balanced by a connection of like vertical extent on the variable pressure side.

The variable pressure is the head of the volume of water in the boiler measured from base level L. An opening 29 in the boiler shell at that level which is as far below the normal operating level as the H level is above it, communicates with a horizontal exterior offtake 31 which as indicated by the diagrammatic showing of fins provides for cooling water passing therethrough to the ambient temperature. At the end of this offtake the piping turns downwardly at 33 to the manometer, which normally as shown would be below the level L, although as will be understood, the piping might be returned from a relatively low level to a manometer at a higher elevation.

If we consider the pressures which are exerted on the manometer in this construction, we need consider only the columns of water above the level L, as below that the water pressures are balanced. On the constant pressure side we have a column of water in the container 15, 17, of a height $h$ at the specific gravity of the hot water plus a column of height $h$ in the downcomer 27 at the specific gravity of cool water. On the opposite side we have the pressure of the column of water inside the boiler at the specific gravity of hot water. When the water level is at the normal operative level this pressure is $h$ times the specific gravity of hot water. The two numbers involving as a factor the specific gravity of hot water then cancel out and the differential pressure on the manometer is $h$ times the specific gravity of cold water and this is true whatever the internal temperature of the boiler may be. Therefore, when the water in the boiler is at the operating level the manometer always indicates that fact at the same point on its scale.

Figure 2:
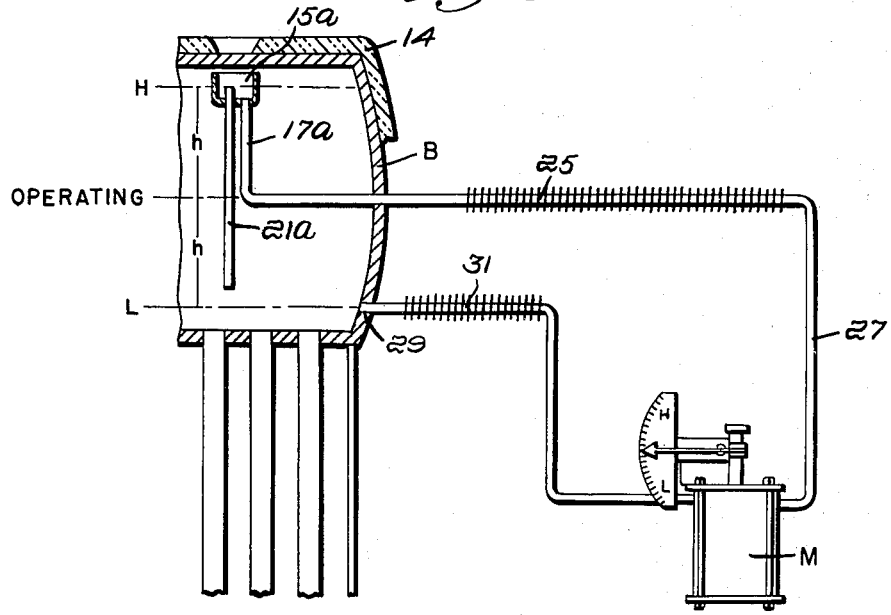
Figs. 2 and 3 are similar views of modified constructions.

In Fig. 2 I have shown a modification in which a chamber, comprising the cup 15a and 17a extending between the high level and the normal operating level, is heated by placing it directly within the boiler, the cup extending into the steam space. A portion of the insulating covering 14 of the boiler may be cut away adjacent the cup to provide a condensing surface for supplying the water to the cup, a constant level being maintained therein by the overflow pipe 21a. From the lower end of the chamber at the operating level a connection is made to the exterior of the boiler and continued as a substantially horizontal offtake 25 corresponding to the offtake 25 in Fig. 1, and having the same effect, and from this the downcomer connection 27 leads to the manometer. The variable pressure connection at 29 with its offtake 31 is the same as in the case of Fig. 1. The analysis of the pressures involved is the same as in the case of Fig. 1.

Figure 3:
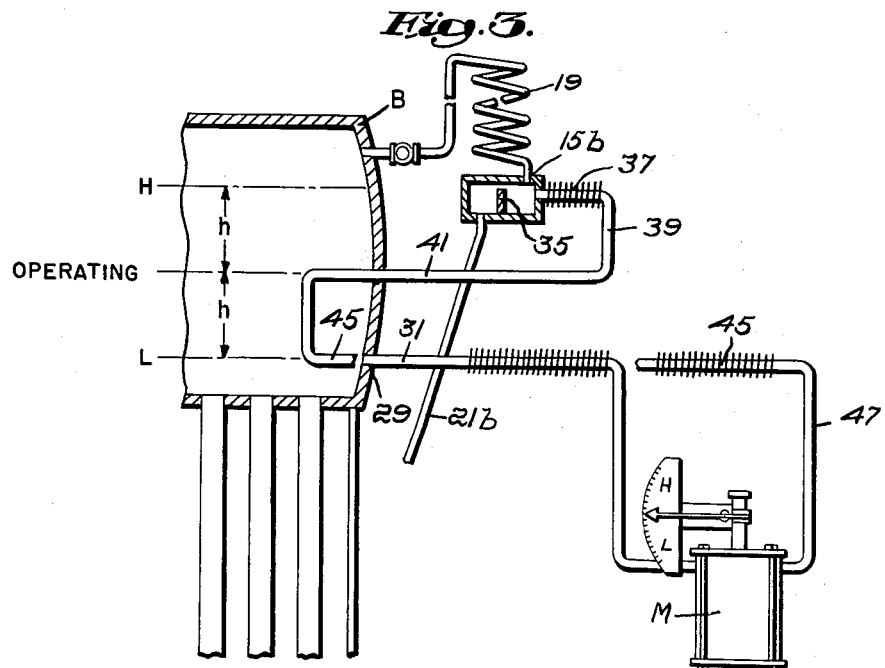

Referring now to the modification of Fig. 3 I there show a construction in which the portion of the constant pressure column below the normal operating line is heated to the temperature of the boiler instead of the portion above the same. For this purpose a datum chamber 15b connected with the steam-containing spaces of the boiler is provided with a wier 35 and condensate supplied at the right of the wier, as shown drains over the same to the pipe 21b, thus maintaining a level at the point H. At this point a horizontal offtake 37 extends for a suitable distance to cool the water therein to the ambient temperature, as indicated by the diagrammatic showing of fins thereon, and at the end of this offtake a pipe section 39 drops to the operating level. Between this point and the low level the water is heated, and I have herein shown the pipe section 41 leading from pipe section 39 entering the boiler and then descending vertically therein at 43 to the low level L where it leaves the boiler to an offtake 45, extending horizontally and suitably designed to effect cooling of the water passing therethrough and thence by connection 47 to the manometer. The variable pressure column may leave the boiler through an opening 29 and the offtake 31 corresponding to those in the other figures. A computation of the heads involved above the level L leads to the same result as in the other cases. However, in this instance the offtakes 31 and 45 might be at a low level L more distant from the operating level than is the high level H, because any additional portion would represent equal heights of hot water, and their effects on the manometer would cancel out.

In the case of the manometer of the type shown, in which a pointer moves at opposite sides of the horizontal line, it is convenient to have the normal operating level at the horizontal position of the scale. When the driving of the pointer is through a magnetic connection, as described in the Winton Patent No. 2,347,861 above referred to, it is possible, by suitable electro-magnetic means to provide a correction to modify the movement of the pointer so that the movement of its end along an arcuate scale corresponds more closely to the vertical movement of the surface of the manometric liquid which it makes manifest. It simplifies the electrical correction to be able to expand the scale with respect to a mid point instead of starting at one end and superimposing a corrective factor to compensate for the non-linearity of the driving connection.

In the application of the invention the gage may be calibrated to provide a full scale deflection at a specified operating pressure or a multiple scale may be used. In any case the advantage of having a fixed position for actual normal operating water level independent of the boiler pressure will be apparent.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A water level measuring device for boilers wherein a water column of predetermined altitude and a water column of an altitude varying with the depth of water in the boiler are placed in communication with the sides of a differential manometer, the first column comprising an upper container extending between the normal "operating" level of the boiler and a point at least as high as the "high water" level of the boiler and a lower container extending between said normal operating level to a point at least as low as the "low water" level of the boiler, said points being equidistant from said "operating" level, means for keeping the upper container filled to a predetermined level at least as high as the said high water level with water under the internal pressure of the boiler, a connection between the lower end of the upper container and the upper end of the lower container, one only of said containers being heated to the internal temperature of the boiler, and means being provided to maintain the column in the other container at the circumambient temperature exterior to the boiler and a conduit leading from the water-containing space of the boiler at the aforesaid point below the "low water" level to the level of the lower end of said lower container, thereby providing the column of varying altitude above referred to, the connections to the manometer including substantially horizontal lengths of piping between the manometer and regions containing water of relatively high temperature providing for cooling the water in the piping to the temperature ambient to the manometer.

2. A water level measuring device for boilers wherein a water column of predetermined altitude and a water column of an altitude varying with the depth of water in the boiler are placed in communication with the sides of a differential manometer, the first column comprising a container extending between the normal "operating" level of the boiler and a point at least as high as the "high water" level of the boiler, means for keeping said container filled to a predetermined level at least as high as the said high water level with water under the internal pressure of the boiler, means for heating the contents of said container to a temperature corresponding to the temperature of the boiler water, a substantially horizontal offtake from the lower end of the container substantially at said "operating level" providing for cooling water passing thereto to the ambient temperature exterior to the boiler, a conduit leading from the water-containing space of the boiler at a point as far below the "operating" level as the first mentioned point is above and extending exterior thereto as a substantially horizontal offtake providing for cooling water passing therethrough to the ambient temperature exterior to the boiler and means for connecting the extremities of the two offtakes to the sides of the manometer passing from said extremities to a level at least as low as the second mentioned offtake.

3. A water level measuring device for boilers wherein a water column of predetermined altitude and a water column of an altitude varying with the depth of water in the boiler are placed in communication with the sides of a differential manometer, the first column comprising a container exterior to the boiler extending between the normal "operating" level of the boiler and a point at least as high as the "high water" level of the boiler, a steam jacket for the container supplied with steam from the boiler, means for keeping the container filled with water to a predetermined level at least as high as the said high water level, a substantially horizontal offtake from the lower end of the container substantially at said "operating level" providing for cooling water passing thereto to the ambient temperature exterior to the boiler, a conduit leading from the water-containing space of the boiler at a point as far below the "operating" level as the first mentioned point is above and extending exterior thereto as a substantially horizontal offtake providing for cooling water passing therethrough to the ambient temperature exterior to the boiler and means for connecting the extremities of the two offtakes to the sides of the manometer passing from said extremities to a level at least as low as the second mentioned offtake.

4. A water level measuring device for boilers wherein a water column of predetermined altitude and a water column of an altitude varying with the depth of water in the boiler are placed in communication with the sides of a differential manometer, the first column comprising a container within the boiler shell extending between the normal "operating" level of the boiler and a point at least as high as the "high water" level of the boiler, an offtake from the lower end of the container leaving the boiler shell at said "operating" level and thence extending substantially horizontally to provide for cooling water passing therethrough to the ambient temperature, a conduit leading from the water-containing space of the boiler at a point as far below the "operating" level as the first mentioned point is above and extending exterior thereto as a substantially horizontal offtake providing for cooling water passing therethrough to the ambient temperature exterior to the boiler and means for connecting the extremities of the two offtakes to the sides of the manometer passing from said extremities to a level at least as low as the second mentioned offtake.

5. A water level measuring device for boilers wherein a water column of predetermined altitude and a water column of an altitude varying with the depth of water in the boiler are placed in communication with the sides of a differential manometer, the first column comprising a container exterior to the boiler shell at a point at least as high as the high water level of the boiler, means for keeping the container filled with condensate from the boiler to a predetermined level at least as high as the said high water level, a pipe opening from said container substantially at said level and extending thence substantially horizontally to provide for bringing water contained therein to the ambient temperature, the pipe then extending to an operating level intermediate between the high and low water levels of the boiler and there entering the boiler shell, extending downwardly therein and leaving the same at a low level to an offtake extending substantially horizontally to provide for cooling water passing thereto to ambient temperature, a conduit leading from the water-containing space of the boiler and extending exteriorly thereto at the same low level as a substantially horizontal offtake providing for cooling water passing therethrough to the ambient temperature exterior to the boiler and means for connecting the extremities of the two offtakes to the sides of the manometer passing from said extremities to a level at least as low as the second mentioned offtake.

6. A water level measuring device for boilers wherein a water column of predetermined altitude and a water column of an altitude varying with the depth of water in the boiler are placed in communication with the sides of a differential manometer, the first column comprising a container exterior to the boiler shell at a point at least as high as the high water level of the boiler, means for keeping the container filled with condensate from the boiler to a predetermined level at least as high as the said high water level, a pipe opening from said container substantially at said level and extending thence substantially horizontally to provide for bringing water contained therein to the ambient temperature, the pipe then extending downwardly to a low level, means for heating that portion of the pipe which extends between an operating level intermediate between the high and low water levels of the boiler and said low level to the internal temperature of the boiler, an offtake from said pipe at said low level extending substantially horizontally to provide for cooling water passing thereto to ambient temperature, a conduit leading from the water-containing space of the boiler and extending exteriorly thereto at the same low level as a substantially horizontal offtake providing for cooling water passing therethrough to the ambient temperature exterior to the boiler and means for connecting the extremities of the two offtakes to the sides of the manometer passing from said extremities to a level at least as low as the second mentioned offtake.

References Cited in the file of this patent

UNITED STATES PATENTS

| | | |
|---|---|---|
| 732,578 | Murphy | June 30, 1903 |
| 2,337,171 | Winton | Dec. 21, 1943 |